United States Patent
Liu et al.

(10) Patent No.: US 11,606,284 B2
(45) Date of Patent: Mar. 14, 2023

(54) SYSTEM AND METHOD FOR FIB AGGREGATION

(71) Applicants: Yaoqing Liu, Potsdam, NY (US); Garegin Grigoryan, Potsdam, NY (US)

(72) Inventors: Yaoqing Liu, Potsdam, NY (US); Garegin Grigoryan, Potsdam, NY (US)

(73) Assignee: CLARKSON UNIVERSITY, Potsdam, NY (US)

( * ) Notice: Subject to any disclaimer, the term of this patent is extended or adjusted under 35 U.S.C. 154(b) by 0 days.

(21) Appl. No.: 16/294,529

(22) Filed: Mar. 6, 2019

(65) Prior Publication Data

US 2019/0280959 A1 Sep. 12, 2019

Related U.S. Application Data

(60) Provisional application No. 62/639,429, filed on Mar. 6, 2018.

(51) Int. Cl.
*H04L 45/021* (2022.01)
*H04L 45/122* (2022.01)
*H04L 45/48* (2022.01)
*H04L 45/00* (2022.01)

(52) U.S. Cl.
CPC .......... *H04L 45/021* (2013.01); *H04L 45/122* (2013.01); *H04L 45/48* (2013.01); *H04L 45/54* (2013.01)

(58) Field of Classification Search
CPC ..... H04L 45/021; H04L 45/122; H04L 45/48; H04L 45/54; H04L 45/742
See application file for complete search history.

(56) References Cited

U.S. PATENT DOCUMENTS

| | | | |
|---|---|---|---|
| 9,491,087 B1* | 11/2016 | Zhang | H04L 45/745 |
| 2013/0212296 A1* | 8/2013 | Goel | H04L 45/7453 |
| | | | 709/238 |
| 2015/0117459 A1* | 4/2015 | Liu | H04L 45/742 |
| | | | 370/392 |

* cited by examiner

*Primary Examiner* — Dady Chery
(74) *Attorney, Agent, or Firm* — George McGuire

(57) ABSTRACT

A system and method for FIB aggregation. FIB Aggregation with Quick Selections (FAQS) is a FIB aggregation algorithm that leverages compact data structures and three unique optimization techniques to quickly and incrementally select next hops when handling route updates. As a result, FAQS can run up to 2.53 and 1.75 times faster for IPv4 and IPv6, respectively, than the optimal FIB aggregation algorithm while achieving a near-optimal aggregation ratio. Meanwhile, it consumes much less memory and generates much smaller number of FIB changes when carrying out frequent updates. The performance enhancement of the new algorithm addresses many concerns from ISPs regarding performance issues, and enhances the probability to push FIB aggregation techniques further to the level of production adoption by the industry.

10 Claims, 15 Drawing Sheets

TABLE 1: FIB aggregation process (a) Original FIB table

| Label | Prefix | Next Hop |
|---|---|---|
| A | 141.92.0.0/16 | 1 |
| B | 141.92.64.0/18 | 1 |
| C | 141.92.0.0/19 | 1 |
| D | 141.92.192.0/19 | 2 |
| E | 141.92.224.0/19 | 2 |

(b) Compressed FIB table

| Label | Prefix | Next Hop |
|---|---|---|
| A | 141.92.0.0/16 | 1 |
| D | 141.92.192.0/19 | 2 |
| E | 141.92.224.0/19 | 2 |

FIG. 1

Algorithm 1 Static FIB Aggregation

1: procedure $StaticAggregation(node)$
2:    $p \leftarrow node.parent$
3:    $l \leftarrow node.left$
4:    $r \leftarrow node.right$
5:    if $T(node) \neq REAL$ then
6:       $O(node) \leftarrow O(p)$
7:    end if
8:    if $l \neq NULL$ then
9:       $StaticAggregation(l)$
10:   end if
11:   if $r \neq NULL$ then
12:      $StaticAggregation(r)$
13:   end if
14:   $setSelectedNexthop(node)$
15:   $setChildFIBstatus(node)$
16: end procedure

FIG. 5

Algorithm 2 Assignment of Selected Next Hop

1: procedure *SetSelectedNexthop(node)*
2:  $l \leftarrow node.l$
3:  $r \leftarrow node.r$
4:  if $l \neq NULL \wedge r \neq NULL \wedge$
   $len(l) - len(node) = 1 \wedge$
   $len(r) - len(node) = 1 \wedge$
   $O(node) \neq S(r)$ then
5:   $S(node) \leftarrow S(l)$
6:  else
7:   $S(node) \leftarrow O(node)$
8:  end if
9: end procedure

FIG. 6

Algorithm 3 Determine FIB status for Children Nodes

1: procedure SetChildFIBstatus(node)
2:     $l \leftarrow node.l$
3:     $r \leftarrow node.r$
4:     if $l \neq NULL$ then
5:         if $S(node) \neq S(l)$ then
6:             $F(l) \leftarrow IN\_FIB$
7:         else
8:             $F(l) \leftarrow NON\_FIB$
9:         end if
10:    end if
11:    if $r \neq NULL$ then
12:        if $S(node) \neq S(r)$ then
13:            $F(r) \leftarrow IN\_FIB$
14:        else
15:            $F(r) \leftarrow NON\_FIB$
16:        end if
17:    end if
18: end procedure

FIG. 7

TABLE II: FIB entries after Aggregation by FAQS

| Label | Prefix | Next Hop |
|---|---|---|
| A | 141.92.0.0/16 | 1 |
| G | 141.92.192.0/18 | 2 |

FIG. 8

Algorithm 4 Incremental FIB Update Handling

1: procedure UpdateNode(prefix, nexthop)
2:    node ← find(prefix)
3:    if node = NULL then
4:       node ← initialize(prefix, nexthop)
5:       T(node) ← REAL
6:       p ← node.parent
7:       if O(p) ≠ O(node) then
8:          UpdateSubtree(node)
9:          UpdateAncestors(node)
10:      end if
11:   else
12:       if T(node) ≠ REAL then
13:          T(node) ← REAL
14:      end if
15:      if O(node) ≠ nexthop then
16:          O(node) ← nexthop
17:          UpdateSubtree(node)
18:          UpdateAncestors(node)
19:      end if
20:   end if
21: end procedure

FIG. 9

Algorithm 5 Update Subtree

1: procedure *UpdateSubtree(node)*
2:   $l \leftarrow node.l$
3:   $r \leftarrow node.r$
4:   if $l \neq NULL \wedge T(l) \neq REAL$ then
5:     $O(l) \leftarrow O(node)$
6:     *UpdateSubtree(l)*
7:   end if
8:   if $r \neq NULL \wedge T(r) \neq REAL$ then
9:     $O(r) \leftarrow O(node)$
10:    *UpdateSubtree(r)*
11:  end if
12:  *setSelectedNexthop(node)*
13:  *setChildFIBstatus(node)*
14: end procedure

FIG. 10

Algorithm 6 Update Ancestors

1: procedure UpdateAncestors(node)
2:     $p \leftarrow node.parent$
3:     while $p \neq NULL$ do
4:         $oldSlctNexthop \leftarrow S(p)$
5:         setSelectedNexthop(p)
6:         setChildFIBstatus(p)
7:         if $oldSlctNexthop = S(p)$ then
8:             break
9:         end if
10:        $p \leftarrow p.parent$
11:     end while
12: end procedure

FIG. 11

(a) IPv4 routing tables

| AS | $n_u$ | $p_{avg}$ | Algorithms | $r$ | $n_c/n_u$ | $t_{aggr}$ | $t_{peak}$ | $n_b=0$ | $n_b=1$ | $n_b\leq 30$ | $b_{max}$ | $m$ |
|---|---|---|---|---|---|---|---|---|---|---|---|---|
| 3356 | 426551755 | 3746 | FAQS | 0.43 | 1.27 | 0.94μs | 3.08ms | 12.75% | 56.21% | 99.97% | 1443 | 175MB |
|  |  |  | FIFA | 0.37 | 1.84 | 2.38μs | 10.29ms | 12.88% | 64.23% | 99.98% | 1496 | 228MB |
| 7018 | 782293331 | 2397 | FAQS | 0.41 | 1.21 | 0.94μs | 3.08ms | 16.43% | 61.71% | 99.99% | 1854 | 175MB |
|  |  |  | FIFA | 0.34 | 1.78 | 2.06μs | 8.39ms | 16.38% | 54.57% | 99.97% | 1892 | 229MB |
| 8492 | 1037180247 | 1126 | FAQS | 0.39 | 1.37 | 0.93μs | 3.27ms | 6.05% | 69.45% | 99.97% | 4268 | 178MB |
|  |  |  | FIFA | 0.32 | 1.90 | 2.33μs | 12.14ms | 6.40% | 63.77% | 99.97% | 4657 | 233MB |
| 1239 | 295234072 | 739 | FAQS | 0.42 | 1.28 | 1.09μs | 3.56ms | 13.18% | 62.18% | 99.98% | 1585 | 175MB |
|  |  |  | FIFA | 0.36 | 1.91 | 2.89μs | 12.68ms | 13.38% | 55.03% | 99.97% | 1932 | 229MB |
| 3130 | 402445803 | 23 | FAQS | 0.27 | 1.23 | 0.95μs | 3.28ms | 14.69% | 63.30% | 99.98% | 6464 | 174MB |
|  |  |  | FIFA | 0.20 | 1.68 | 2.04μs | 16.02ms | 14.91% | 56.74% | 99.98% | 5524 | 228MB |

(b) IPv6 routing tables

| AS | $n_u$ | $p_{avg}$ | Algorithms | $r$ | $n_c/n_u$ | $t_{aggr}$ | $t_{peak}$ | $n_b=0$ | $n_b=1$ | $n_b\leq 30$ | $b_{max}$ | $m$ |
|---|---|---|---|---|---|---|---|---|---|---|---|---|
| 6939 | 122803741 | 2729 | FAQS | 0.63 | 1.06 | 0.76μs | 1.27ms | 7.08% | 84.19% | 99.99% | 181 | 11MB |
|  |  |  | FIFA | 0.61 | 1.18 | 1.33μs | 2.97ms | 7.09% | 81.19% | 98.98% | 258 | 14MB |
| 33437 | 334886608 | 7 | FAQS | 0.58 | 0.98 | 0.90μs | 1.42ms | 17.47% | 73.68% | 99.99% | 2447 | 11MB |
|  |  |  | FIFA | 0.56 | 1.11 | 1.43μs | 2.48ms | 17.46% | 68.33% | 99.99% | 2432 | 14MB |

TABLE III: Evaluation summary (2011-2016 period). $n_u$ - the number of FIB updates; $p_{avg}$ - average peer number; $r$ - aggregation ratio; $n_c/n_u$ - the ratio between the number of FIB changes and FIB updates; $t_{aggr}$ - average aggregation time per update; $t_{peak}$ - peak aggregation time; $n_b$ - percentage of updates with burst values 0, 1 and below 30; $b_{max}$ - maximum burst value; $m$ - memory consumption.

FIG. 14

SYSTEM AND METHOD FOR FIB AGGREGATION

CROSS-REFERENCE TO RELATED APPLICATIONS

This application claims priority to U.S. Provisional Patent Application Ser. No. 62/639,429, filed on Mar. 6, 2018 and entitled "Toward Incremental FIB Aggregation with Quick Selections (FAQS)," the entirety of which is incorporated herein by reference.

BACKGROUND OF THE INVENTION

1. Field of the Invention

The present invention is directed generally to a system and method for FIB aggregation and, more particularly, to a FIB aggregation algorithm that leverages compact data structures and three unique optimization techniques to quickly and incrementally select next hops when handling route updates.

2. Description of Related Art

Several factors contribute to the super-linear growth of global Forwarding Information Base (FIB) size. First, the tremendous growth of the number of Internet users results in new network prefixes to be allocated and advertised. Second, network operators often divide a large block of IP prefixes allocated to an Autonomous System (AS) into smaller ones and advertise them via Border Gateway Protocol (BGP) to enable fine-grained traffic engineering. According to several research studies, around 50% of BGP-announced prefixes are more specific prefixes, i.e., the total address space they cover belongs to large address blocks allocated by Internet Assigned Numbers Authority (IANA). 40% of these more specific prefixes are attributed to Traffic Engineering, which is used by network administrators to avoid congested paths or to fight against prefix hijacking. Address fragmentation by multi-homing, a practice to connect an end-user network to more than one network in order to provide high throughput and resilient connectivity, is another source of extra prefixes in a routing table. Overall, the number of entries in FIB has increased almost 40 times since 1994, when the current BGP version 4 emerged. In 2017, the size of FIB has approached 710,000 entries for IPv4 and 40,000 for IPv6, and continues to increase with a super-linear pace.

Supporting the current size of FIB and its growth is a challenging task for Default-Free Zone (DFZ) network operators as they are forced to periodically upgrade their routing hardware in order to fit the FIB into line cards. It is a heavy financial burden for many small Internet Service Providers (ISPs) to migrate old hardware to new one due to the high costs of line cards and operational expenses. Some operators avoid upgrading expenses by filtering out specific prefixes with prefix length more than 24, thus affecting the reachability of the Internet. The increasing size of global FIB may also increase chip space for Ternary Content-Addressable Memory (TCAM) design, the Longest Prefix Match (LPM) lookup time and energy consumption by line cards.

To mitigate the FIB scalability problem, a number of possible solutions were put forward. They can be classified into two broad categories: long-term solutions and short-term solutions. The long-term solutions include revision of the business relations between ASes, e.g., network operators working in the Default-Free Zone (DFZ) can be compensated for keeping all routes in FIB, and re-design of the routing architecture, e.g., splitting address space into a locator (for routing systems) and an identifier (for end systems), may significantly reduce the size of global FIB table, but its wide deployment may take a long time.

FIB aggregation falls into the category of short-term solutions. Network operators believe it to be one of the most feasible solutions at this moment as it has a clear benefit and many ISPs are seeking such a solution to reduce their operational costs and mitigate their routing scalability problem. FIB aggregation does not require changes on routing hardware and routing architecture, and can be applied locally to each individual router. Several FIB aggregation techniques, such as Optimal Routing Table Constructor (ORTC) algorithm, can greatly reduce the number of FIB entries for an IPv4 FIB by more than 50%. When comparing this result to the rates of FIB growth, we infer that the FIB aggregation may prolong a router's lifetime up to 9 years. However, existing FIB aggregation approaches, such as ORTC-based aggregation algorithms, suffer from a number of challenges that remain to be addressed:

First, existing FIB aggregation approaches have high time costs for processing route updates, including additions, withdrawals and changes. The state-of-the-art FIB aggregation algorithm, Fast Incremental FIB Aggregation (FIFA), can achieve an optimal aggregation ratio for each update, but needs to perform two subtree traversals in the control plane to update an FIB into aggregated and optimal state. Delayed FIB update handling might lead to congestion between the data and control plane of a router.

Second, individual routing updates result in significant number of changes in FIB, called FIB bursts. Large scale of FIB bursts in the data plane may adversely affect line-rate traffic forwarding and its correctness. One of the main reasons is that implementation of the Longest Prefix Matching on TCAM requires the forwarding table to be sorted by prefix length. Therefore, insertion of new entries into TCAM is a relatively slow operation.

Finally, in existing FIB aggregation approaches, the optimal compression ratio is achieved at the expense of high memory usage: each node generated by the aggregation algorithm in the control plane contains an array of variable size, which stores next-hop candidates to be used for next hop selection for aggregated prefixes. Meanwhile, a router's control plane's memory is constrained since it has to handle frequent BGP updates, update the Routing Information Base (RIB) and its copy of an FIB simultaneously.

A typical Internet router consists of two main components: (1) a Control Plane and (2) a Forwarding (or Data) Plane. The duty of the Control Plane is to run different routing protocols including BGP and to exchange routes with neighbor routers. The Control Plane also runs a BGP decision process to pick the best routes among all collected routes. The selected best routes will be pushed into the Data Plane. All involved data structures and processes in the Control Plane normally use relatively cheap, slow and large Dynamic Random Access Memory (DRAM).

The Forwarding or Data Plane is dedicated for packet forwarding. It maintains a Forwarding Information Base (FIB), the entries of which are derived from the best routes from the Control Plane. To guarantee fast next hop lookup for each incoming packet, FIB memory resides on highly expensive line cards with Ternary Content-Addressable Memory (TCAM) chips. For an incoming packet, the next hop value is selected from FIB according to the Longest Prefix Matching (LPM) rule: among multiple matches of different next hops for the same destination address, the one with the most specific (or the longest) prefix will be selected to forward the packet.

An example for the LPM rule using a FIB described in Table I(a) shown in FIG. 1, which contains 5 routes, each of which consists of a Prefix field and the corresponding Next Hop field. Suppose, a router with this FIB receives a packet with destination IP address 141.92.192.220. This IP address matches two entries A and D in the given FIB table, with next hops values equal to 1 and 2, respectively. However, a forwarding decision will always end up with the next hop 2, because the prefix 141.92.192.0/19 is a more specific prefix than 141.92.0.0/16 for the destination IP address 141.92.192.220 within this FIB.

FIB aggregation refers to a certain process that merges two or more FIB entries with the same next hop into one. The rationale is that as long as data packets can be forwarded with the correct next hop and reach their destinations correctly, they do not care using which route, either the original one or an aggregated one with a different prefix length. While FIB aggregation may significantly compress the size of FIB, the aggregation process must ensure 100% forwarding correctness and should not change the forwarding behaviors of any packet. Namely, the next hop for any packet should be the same before and after aggregation. In Table I(a), in FIG. 1, FIB entries B and C have the same next hop value as the entry A, which fully covers IP address blocks of both B and C. Hence, excluding entries B and C from FIB table will not change the forwarding behaviors for any packets matching against B or C, which preserves the Forwarding Correctness rule. Excluding entries D or E, in contrast, will not preserve Forwarding Correctness, e.g., packets with destination IP addresses from these blocks will be forwarded to the next hop 1 instead of 2. One compressed FIB after aggregation is given on Table I(b), in FIG. 1, with 3 entries, which yields the same forwarding behaviors as the original unaggregated FIB. FIG. 1 illustrates a simple example for correct FIB aggregation and many more complicated cases must be handled by an effective aggregation algorithm.

Therefore, there is a need for a compact data structures and efficient algorithms to aggregate real FIB tables with hundreds of thousand entries.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

FIG. 1 is an original FIB table and a compressed FIB table;

FIG. 5 is a Static FIB Aggregation algorithm;

FIG. 6 is an algorithm for assigning a Selected Net Hop;

FIG. 7 is an algorithm for determining FIB status of child nodes;

FIG. 8 is a table of FIB entries after aggregation by FAQS;

FIG. 9 is an algorithm for incremental FIB update handling;

FIG. 10 is an algorithm for updating subtrees;

FIG. 11 is an algorithm for updating ancestors;

FIG. 14 is a table comparing the results of the FAQS and FIFA algorithms for both IPv4 and IPv6 routing tables.

SUMMARY OF THE INVENTION

Figure 2:
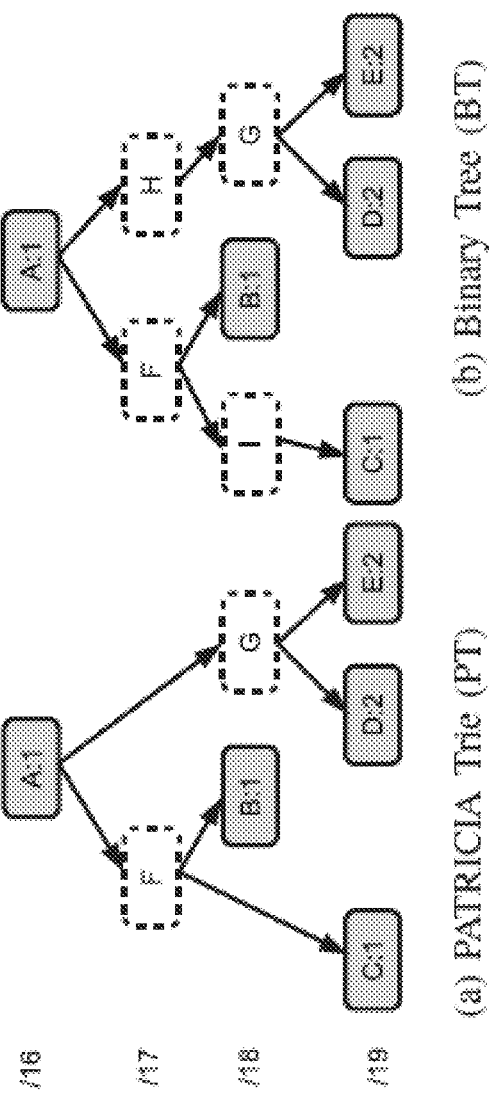
FIG. 2 is a comparison of a PATRICIA trie (PT) and a Binary Tree (BT) for the tables in FIG. 1.

The present invention is a new ultra-fast FIB aggregation algorithm: FIB Aggregation with Quick Selections (FAQS). The algorithm uses a single tree traversal to conduct FIB aggregation. FAQS leverages three optimization techniques to handle routing updates incrementally, i.e., without re-aggregation of the whole forwarding table. On a single BGP update, in the worst case, FAQS will traverse the subtree rooted at the updated node and its parents' nodes only. On the contrary, FIFA may need to traverse the whole tree in the worst case. Furthermore, unlike FIFA, which needs to keep a candidate list of next hops on intermediate nodes, FAQS only keeps a single next hop and considerably reduces the consumption of memory space in the control plane. FAQS achieves high compression ratios: reducing the number of FIB entries by up to 73% for IPv4 and 42% for IPv6. FAQS runs up to 2.53 and 1.75 times as fast as existing FIFA-S algorithm for IPv4 and IPv6 FIBs, respectively. FAQS reduces the average number of FIB changes by 30% for IPv4 routing tables and by 10% for IPv6 routing tables. FAQS can save up to 30% of memory consumption compared with FIFA-S algorithm that achieves optimal aggregation ratio.

The present invention is directed to systems and method for FIB aggregation. According to one aspect, the present invention is a forwarding information base (FIB) aggregation system. The FIB aggregation system includes a router having a control plane with a routing information base (RIB) and a data plane with a forwarding information base (FIB). The control plane is configured to run a BGP decision process. The system also includes a plurality of routes movable from the RIB to the FIB and an aggregation module at the control plane. The aggregation module is configured to aggregate the plurality of routes and generate a copy of the FIB having the aggregate the plurality of routes. The system also includes one or more flags associated with the copy of the FIB having the aggregate the plurality of routes.

According to another aspect, the present invention is a method for FIB aggregation. The method includes the steps of: (i) providing a PATRICIA trie (PT) data structure built from a FIB, the PT data structure having a plurality of nodes and each node having the fields: node type, original next hop, selected next hop, and FIB status, and wherein the PT data structure has a top and a bottom and the plurality of nodes includes a root node at the top of the PT data structure; wherein the node type is FAKE or REAL; (ii) identifying each FAKE node type starting from the top of the PT data structure at the root node and moving toward the bottom of the PT data structure; (iii) creating an original next hop for each FAKE node type identified; (iv) assigning a first value to the original next hop for each FAKE node type identified; wherein the first value is the same as the original next hop of a nearest node having a REAL node type; (v) assigning a selected next hop to each node starting from the bottom of the PT data structure and moving toward the top of the PT data structure; (vi) determining a FIB status of each node starting from the bottom of the PT data structure and moving toward the top of the PT data structure; and wherein the selected next hop assigned to each node and the FIB status of each node depends on the positioning of the node in the PT data structure.

According to yet another aspect, the present invention is a method for installing FIB changes. The method includes the steps of: (i) providing a forwarding information base (FIB) aggregation system, including a router having a control plane with a routing information base (RIB) and a data plane with a forwarding information base (FIB), and an aggregation module at the control plane; (ii) receiving a plurality of routes at the aggregation module from the RIB; (iii) aggregating the plurality of routes via the aggregation module to generate an aggregated FIB; (iv) downloading the aggregated FIB into the FIB; (v) copying the aggregated FIB with one or more flags representing a processing decision to generate an aggregated FIB copy; (vi) storing the aggregated FIB copy at the aggregation module; (vii) receiving a router update at the RIB and updating the RIB according to the router update; (viii) transmitting the router update to the aggregation module after it updates the RIB; and (ix) updating the aggregated FIB copy, via the aggregation module, according to the router update.

These and other aspects of the invention will be apparent from and elucidated with reference to the embodiment(s) described hereinafter.

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Referring now to the figures, wherein like reference numerals refer to like parts throughout, FIG. 2 shows the differences between a PATRICIA trie (PT) and a Binary Tree (BT) for the FIB in Table I of FIG. 1. The PATRICIA tie (PT) data structure is shown and described in U.S. patent application Ser. No. 16/294,171, which is incorporated herein in its entirety by reference, and should be understood by a person of ordinary skill in the art in conjunction with a review of this disclosure and accompanying drawings. As described herein, PATRICIA trie (PT) is leveraged to store FIB entries. While PT is still a BT, unlike a full BT, which requires that the length difference between a parent and child node is exactly one, the difference in a PT can be more than 1. As can be observed, the use of a PT can significantly reduce memory consumption and the number of memory access times for a search. This feature is especially critical for compact representation of IPv6 routing tables, which have 128-bit address space. Each node in the PT consists of a route prefix, a prefix length, an original next hop, a selected next hop, a node type and a FIB status, as described in detail below.

The main challenge for FIB aggregation is the trade-off between the compression ratio, the running time, and the update handling efficiency. Previous studies, such as Level-1 and Level-2 aggregation achieved fast aggregation by merging only adjacent nodes with the same next hop value, all within one post-order traversal over a PT, but it results in relatively inefficient aggregation and slow update handling. FIFA-S aggregation algorithm, on the contrary, achieves optimal FIB aggregation at the cost of two traversals over a PT and additional data structures to store candidate next hop sets and several other parameters on each node. This results in relatively inefficient update handling. When designing new aggregation algorithms, we aim to balance difference metrics, giving running time and update handling efficiency slightly higher priority than compression ratio, although compression ratio is a primary consideration, the rationale is that aggregation effectiveness depends on the worst aggregated FIB size after each update rather than the optimal one. Specifically, we strive to minimize the number of memory accesses to enhance its performance while maintaining a near-optimal FIB aggregation ratio. As a rule of thumb, the resultant aggregated FIB must not violate the Forwarding Correctness rule.

Figure 3:
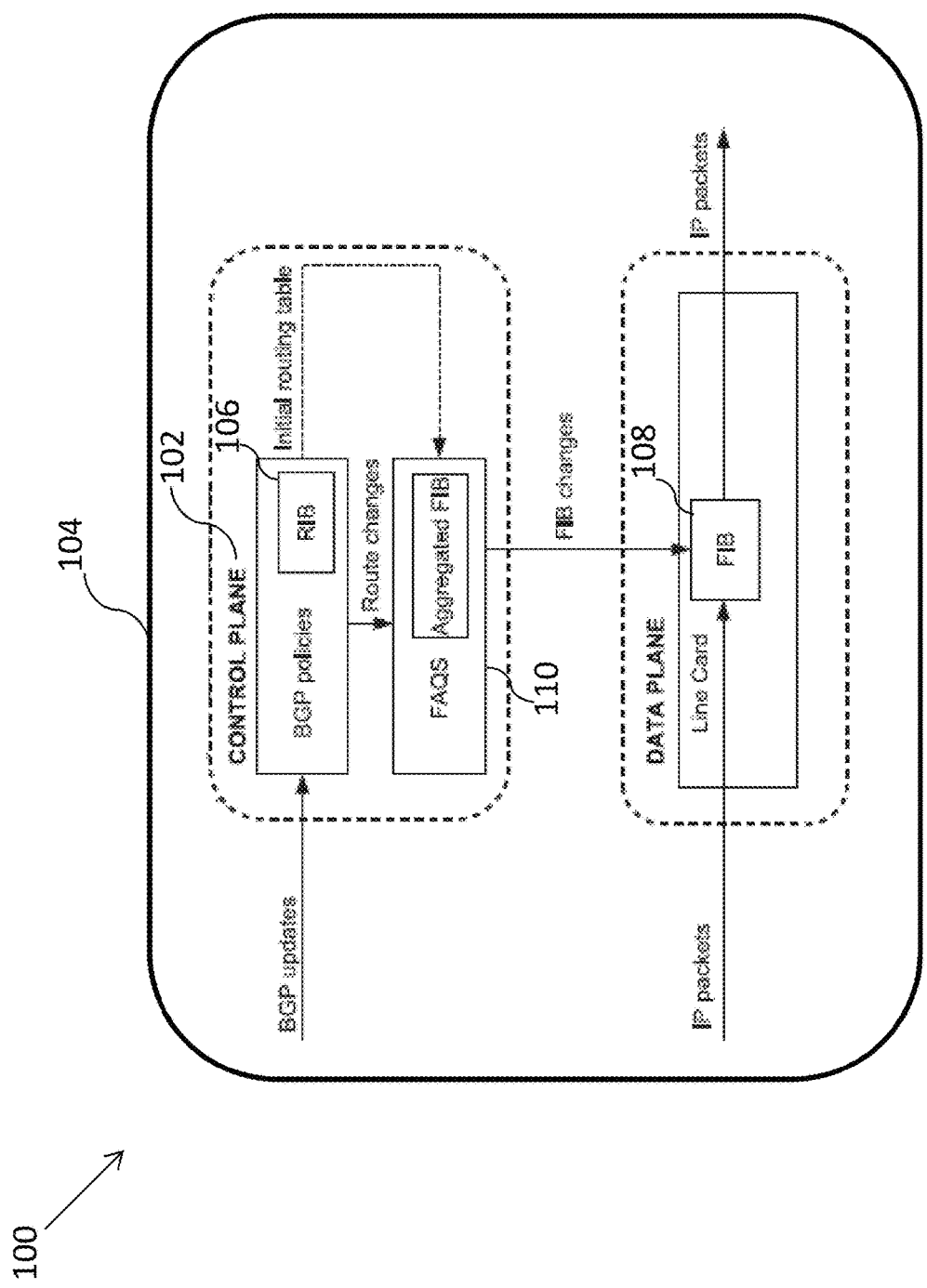
FIG. 3 is a FAQS module.

Referring now to FIG. 3, as illustrated, FIB aggregation and FAQS algorithm (the FIB aggregation system 100) operate in a Control Plane 102 of a router 104, between the Routing Information Base (RIB) 106 and the Forwarding Information Base (FIB) 108. When the router boots up, FAQS algorithm (at an Aggregation Module 110 in the Control Plane 102) aggregates the initial set of routes from the RIB 106 and downloads them into the FIB 108, a process termed "Static FIB Aggregation." Meanwhile, FAQS keeps a copy of the aggregated FIB with various flags to process future route updates. When a route update, either an addition, a change, or a withdrawal, is advertised via a routing protocol, e.g., BGP, the router first updates RIB in accordance with BGP decision process.

Subsequently, the routing changes are pushed to the aggregation module, where FAQS algorithm carries out incremental FIB updates over the aggregated FIB derived from the previous process of Static FIB Aggregation. Due to the incremental update handling, one route update may not always lead to changes in the FIB, but it may also result in multiple FIB changes: adding new entries to the FIB, changing next hop values for existing entries, or deleting existing entries. If there are FIB changes, FAQS installs them in the line cards located in the Data Plane.

Static FIB Aggregation uses a PATRICIA trie (PT) data structure where each node in the PT has the following fields (assuming the current node labeled as n): (i) Node Type—denoted by T(n). If a node was derived from an original FIB entry, the value is true or REAL; otherwise, if a PT node is only an ancillary node that helps form the PT, the value is false or FAKE. For example, T(F)=T(G)=FAKE, and T(A) =T(B)=T(C)=T(D)=T(E)=REAL in FIG. 4(a). (ii) Original Next Hop. The next hop value that is associated with an original FIB prefix and is mapped to a PT node, denoted by O(n). For a REAL node, it is taken from the FIB; for a non REAL node, it is derived from the original hop of the nearest REAL ancestor node. This instantiation process is carried out during aggregation. (iii) Selected Next Hop. The next hop value of a prefix after aggregation, denoted by S(n). Note that Selected Next Hop may be different from Original Next Hop for the same prefix as long as aggregated FIB has exactly the same forwarding behaviors as the original one. (iv) FIB Status. After aggregation, every node or prefix has a FIB status, which indicates whether the prefix and the Selected Next Hop should be placed in the FIB or not, denoted by F(n). F(n)=IN FIB represents yes and F(n)=NON FIB represents no. All routes with status (n)=IN_FIB account for the entire aggregated FIB.

Figure 4:
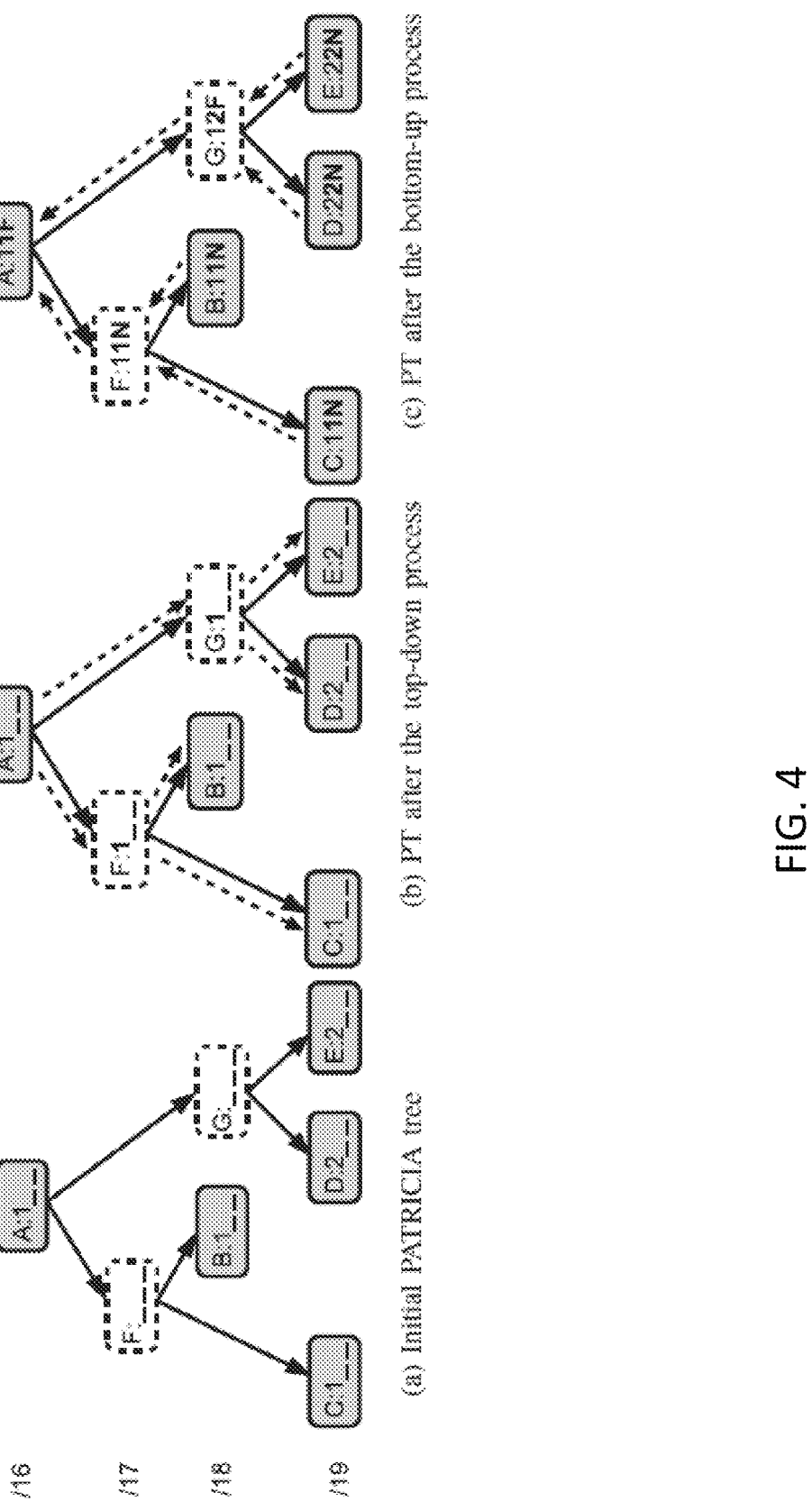
FIG. 4 is a comparison of an initial PT, a PT after a top-down process, and a PT after a bottom-up process.

After the PT is built from an original FIB, all corresponding prefixes have an initialized original next hop, a REAL node type, and an empty selected next hop. Each other prefix that is not from the original FIB has an empty original next hop, a FAKE node, and an empty selected next hop. Starting from here, as shown in FIG. 4(a), Static FIB Aggregation uses one-time post-order traversal to complete the whole aggregation, which consists of a recursive top-down and bottom-up stage.

(1) Post-Order Top-Down Instantiation for Original Next Hop: A default route 0/0 is assumed and the next hop always exists and the root node type is REAL (this may not be always true in a real FIB, but for simplicity, a next hop value 0 is used to indicate a packet drop). From the root node of the PT, we instantiate the original next hop of each FAKE node and the value is assigned the same as the original next hop of its nearest REAL ancestor, namely, O(n)=O(n.ancestor). According to the LPM rule, it is easy to prove that this assignment will not change the forwarding correctness. FIG. 4(b) shows the results after top-down process and the next hops of FAKE nodes O(F)=O(A)=1 and O(G)=O(A)=1, both of which are derived from the nearest REAL ancestor A.

(2) Post-Order Bottom-Up Assignment for Selected Next Hop and FIB Status: The bottom-up process consists of two operations for each node: assigning selected next hop and determining FIB status. The first operation assigns the value of the selected next hop for a node as follows: (1) Leaf nodes: the value of its original next hop. Namely, S(n)=O(n), where n does not have any child. (2) Internal nodes: S(n)=S(n.l), when the following conditions are satisfied: O(n)!=S(n.r), len(n.l)−len(n)=1 and len(n.r)−len(n)=1, where n.l and n.r are node n's left and right child, and len(n) represents the length of the prefix on node n. Intuitively, the selected next hop value equals to its left child's selected next hop, when this node has two children nodes and the prefix length differences between this node and both of its children are exactly one, and the right child's selected next hop is different from its own original next hop. It is possible that this node's original next hop is different from both children's selected next hops, then left child's selected next hop will be given higher priority for the selection. This is a consistent decision for the whole aggregation process. (3) S(n)=O(n) in other cases. There are mainly three cases: (a) Missing a child node; (b) The length of a child's prefix is longer than that of this node by more than 1; and (c) The selected next hop of a child equals to the original next hop of this node. The decisions of the first two cases are to ensure the forwarding correctness, but the third one is to enhance the possibility of better aggregation ratio.

The next step is to determine FIB status. Assume n.l and n.r are directly connected children of node n. Both left and right children have the same actions as follows.

F(n.l)=IN_FIB, if n.l exists and S(n.l)!=S(n); F(n.l)=NON_FIB otherwise.

F(n.r)=IN_FIB, if n.r exists and S(n.r)!=S(n); F(n.r)=NON_FIB otherwise.

Intuitively, aggregation is started from the longest or leaf prefixes and recursively assign selected next hops based on their original next hops. When a child's selected next hop is the same as its parent, the child's prefix and selected next hop can be excluded from downloading to FIB, and from then one its parent will be responsible for traffic forwarding instead of itself, where forwarding correctness can still be guaranteed. Since every child and its parent follow the same rule, the resultant aggregated FIB will have exactly the same forwarding behaviors as the original one. FIG. 4(c) shows the results after the bottom-up process. Algorithms 1, 2, and 3, in FIGS. 5, 6, and 7, respectively, present the pseudo code for the static FIB aggregation process. Finally, Table II in FIG. 8 illustrates the aggregated results, where the original five FIB entries are aggregated into two.

FIB updates consist of two categories: (i) Route Announcements, including new routes and route changes, and (ii) Route Withdrawals. How the FAQS algorithm handles both categories of FIB updates is described in detail below.

First, regarding route announcements, when receiving a route announcement, if it is a new route, FAQS algorithm generates a REAL node with the corresponding original next hop in the PT; if it is a route update, it simply changes the original next hop value accordingly. In order to maintain a good aggregation ratio and forwarding correctness, the aggregated FIB needs to be re-aggregated. Re-aggregating the whole PT from scratch is not efficient because various time-consuming and computation-intensive operations. Instead, existing calculated values must be taken advantage of to incrementally update the aggregated FIB in order to maximally reduce the processing overhead caused by the update. Two portions of the PT may be affected, the subtree rooted at the updated node and the ancestors upon it. Specifically, the original next hop, the selected next hop and the FIB status of each node under the subtree need to be checked and updated if necessary. The process is similar to the procedure of the static FIB aggregation for the entire PT. Also, the selected next hop and FIB status of each ancestor need to be checked and refreshed if necessary to maintain forwarding correctness. The procedure seems to be tedious, however, following three crucial optimization techniques are leveraged to greatly reduce the overall time costs and memory access times.

(i) When adding a REAL node or updating a FAKE node, if the original next hop of this node's parent O(n.parent) is same as the updating one, namely, O(n)=O(n.parent), when T(n)=FAKE, then the top-down process can immediately terminate. The correctness of this statement can be proved, because during the recursive top-down update-subtree process, only a parent's original next hop can influence its children's original next hops; since a parent's original next hop in the subtree does not change, other even lower children's and descendants' original next hops will not change either.

(ii) During the period of updating the subtree, if the node type of a node in the subtree is REAL, namely, T(n)=FAKE, then the top-down process can stop on the current branch. Similar to the first statement, the correctness can be guaranteed because all FAKE nodes' original next hops are derived from their nearest REAL ancestor's original next hop. When the updated node is above this REAL node, all original next hops under this REAL node will not change.

(iii) During the period of updating the ancestors, if the newly selected next hop of an ancestor is the same as the old one before the update, then this updating ancestor process can stop. This statement can also be proved for its correctness: according to the static aggregation process, a parent's selected next hop is determined by its children's selected next hop values. During the upward process, the update only happens on one branch and thus only one node's selected next hop value may change for each level. If the newly selected value is the same as the old one, all upper updating process will end up with the same results, thus we can skip this process to save computational costs.

Figure 12:
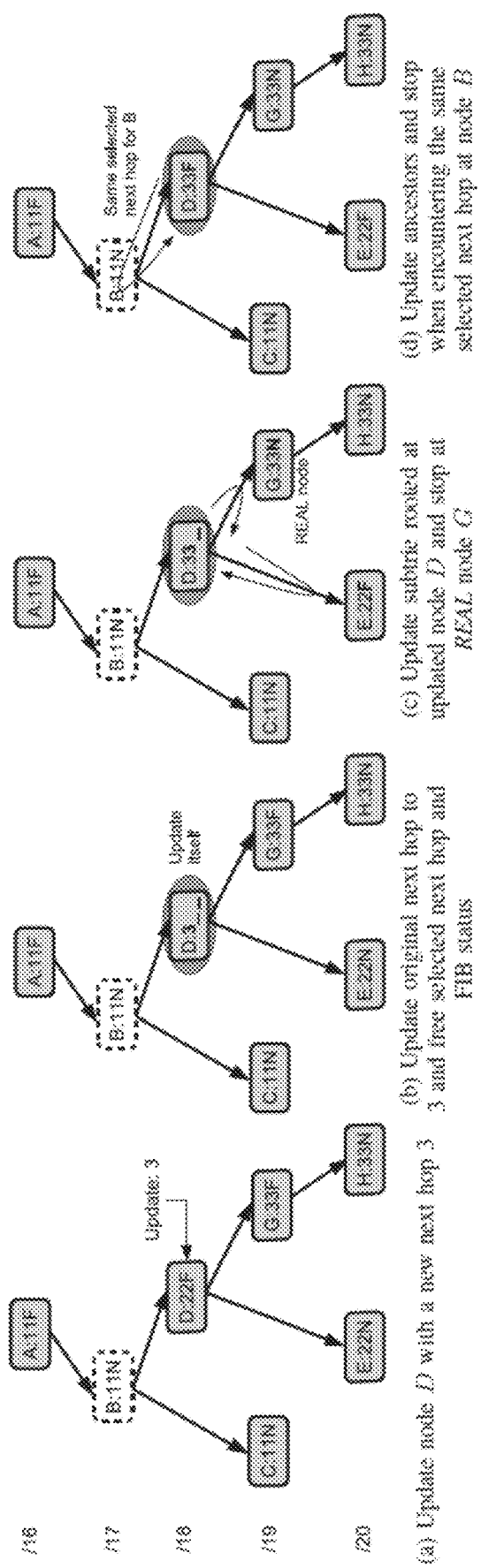
FIG. 12 illustrates an exemplary process for updating a route with a new next hop.

Algorithms 4, 5, and 6 (in FIGS. 9, 10, and 11, respectively) illustrate the whole process of incremental update handling and FIG. 12 demonstrates an example to update a route with a new next hop, where the second and third optimization techniques are applied. In the example, Node D has an update with a new next hop 3. First, the original next hop changes to 3 and other fields are freed; then, the update-tree process stops when encountering a REAL node G. After that, the update-ancestor process stops when the same selected next hop 1 is discovered at node B. As a result, it can be observed that only a small portion of the trie has been traversed to incrementally handle the update.

Second, regarding route withdrawal, The FAQS algorithm handles the prefix withdrawals with two steps: (i) Node removal. First, FAQS looks up the corresponding REAL node from the PT. If the node is found, then check if the node is removable. A removable node refers to a node, which will not affect the PT structure after its deletion; otherwise, it is not removable. If it is removable, the algorithm deletes the whole node and reorganizes the PT structure; otherwise, it changes the node type to FAKE and frees the values of the original next hop, the selected next hop and the FIB status. (ii) Trie update. Starting from the parent node of the deleted or updated node, the incremental update process will be the same as the case of route announcements. First, FAQS does a top-down update of the original next hops of nodes on the subtree; next, it bottom-up updates of the values of the selected next hops and the FIB status for each node all the way to the point where a new selected next hop yields the same value as the old one. The three optimization techniques used in route announcements apply here as well.

Evaluation

The FIB aggregation algorithm (FIB Aggregation with Quick Selections (FAQS)) described above was tested using realistic IPv4 and IPv6 routing tables from 2011 to 2016 in Route Views project for evaluation. One baseline routing table was collected on Jan. 1, 2011 for both IPv4 and IPv6, and applied all following updates to obtain the aggregation results. AS neighbors were used as the next hops for FIB tables because local FIB interface information is not available in the dataset. Normally, the number of interfaces in a FIB is much less than the number of its neighbors. Thus, the results underestimate the real FIB aggregation effects. The forwarding behaviors were verified before and after aggregation and they are equivalent. The experiments were run on an Intel Xeon Processor E5-2603 v3 1.60GHz machine. The above described FAQS algorithm was compared with the optimal ORTC-based FIFA-S aggregation algorithm. Unlike FIFA-T, a faster version of FIFA algorithms, FIFA-S has significantly smaller FIB bursts, which is critical since writing operations on TCAM are slow.

The following metrics were used in the experiment: (1) FIB Size: the total number of entries before and after aggregation. Aggregation Ratio is calculated by the ratio between the total number of the FIB entries after aggregation and before aggregation. (2) FIB Aggregation Time: the time spent handling all route updates by the aggregation algorithm (before pushing FIB changes into the data plane). (3) Total Number of FIB Changes: the total number of FIB changes that are pushed into the data plane by the aggregation module upon handling all route updates. One route update from the control plane may result in zero or more FIB changes to the data plane FIB due to the incremental FIB aggregation process. If there is no aggregation, one route update corresponds to one FIB change. (4) FIB Burst: The number of FIB changes caused by a single route update, either a route announcement or a withdrawal.

For the IPv4 results, five routing tables from different ASes were used to demonstrate the dependency of aggregation performance on the number of neighbors (i.e. the number of possible next hops). The number of next hops ranges from 21 to 4500. To illustrate the worst case, a routing table in AS3356 was used that has 4500 next hops on Dec. 31, 2016. There are more than 426 million route updates to be handled for the 6-year period.

Figure 13:
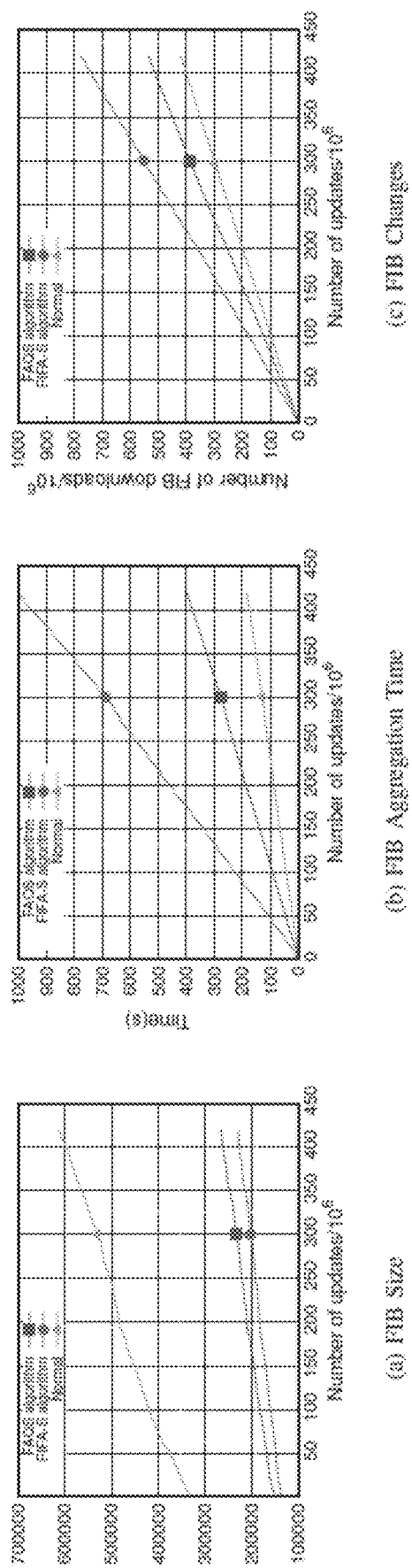
FIG. 13 shows graphs of the FIB size, FIB aggregation time, and FIB changes for FIB aggregation of an IPv4 routing table.

FIG. 13(*a*) shows the number of FIB entries without aggregation, using FIFA-S algorithm and FAQS aggregation algorithms. The top green line marked by a triangle represents the FIB size without aggregation. The middle line marked by a rectangle represents the FIB size after FAQS and the bottom line represents the FIB size after FIFA-S. Both of the aggregation algorithms can compress the original FIB by around 60%. Since FIFA-S reaches optimal aggregation ratio for each route update, FAQS can achieve near-optimal aggregation ratio.

However, FAQS uses much less time to complete the aggregation as shown in FIG. 13(*b*). FIFA-S takes around 1000 s to finish with an average 2.38 µs per update, while FAQS takes about 400 s to finish with an average 0.94 µs per update. Thus, FAQS is 2.53 times faster than FIFA-S but bears similar aggregation ratio. The primary reason is that FIFA-S needs to traverse a subtree twice to handle an update with additional memory consumption but FAQS only needs one-time traversal, as described above. The numbers also indicate that FAQS can handle more than 1 million updates per second and can be well adopted by Internet backbone routers, given that BGP churn can be up to 500,000 per minute.

The smaller number of FIB changes to the FIB, the better performance. FIG. 13(*c*) shows that FAQS algorithm generates 31% less number of FIB changes than that of FIFA-S algorithm (543,309,259 vs 786,633,132). The average number of FIB changes per update is 1.27 for FAQS and 1.84 for FIFA-S. Both algorithms have similar distribution for the size of FIB bursts as shown in Table III(a) in FIG. 14. The vast majority of FIB bursts (more than 99.97%) in both algorithms consist of 30 FIB changes and less. The largest FIB burst for FAQS is 1443, which is slightly smaller that FIFA-S (1496). Nonetheless, the update handling time cost for the largest burst in FAQS takes only 30% of running time of FIFA-S. Table III(a) in FIG. 14 presents other evaluation results of FIB aggregation for the five ASes. It is interesting to observe that a good percentage (6.05%-14.91%) of FIB updates result in zero FIB changes (column nb=0).

Figure 15:
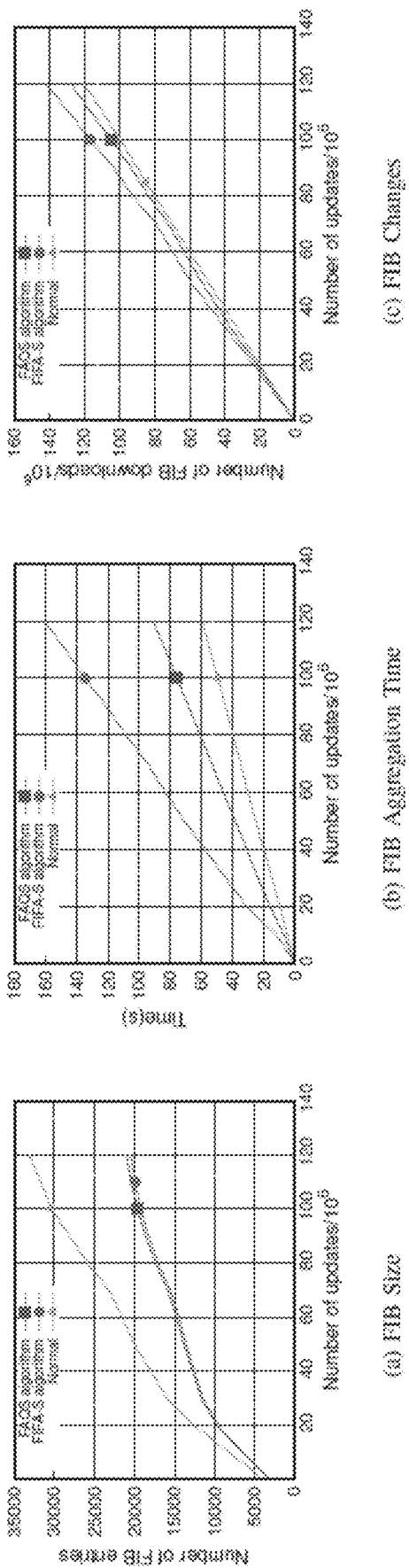
FIG. 15 shows graphs of the FIB size, FIB aggregation time, and FIB changes for FIB aggregation of an IPv6 routing table.

For the IPv6 results, this is likely the first time that IPv6 routing tables have been evaluated for their aggregation results. FIB tables from AS 6939 with 3501 next hops were aggregated. The total number of route updates to be handled is more than 122 million. FIG. 15 shows the curves of FIB size, aggregation time and the total number of FIB changes. In FIG. 15(*a*), it can be observed that the size of IPv6 routing tables has increased dramatically since six years back, when there were only less than 5,000 entries. In the end of 2016, it has been close to 35,000. Due to the small size, the aggregation ratios for both FAQS and FIFA-S are around 60%, which are not as good as IPv4. Since FIFA-S outputs the smallest aggregated FIB, FAQS's aggregation ratio for IPv6 is close to optimal. Remarkably, the running time of FAQS is much lower than FIFA-S (90 s vs 160 s in FIG. 15(*b*)) while they have similar aggregation ratios, which again attributes to the one-time subtree traversal with three important optimization techniques for FAQS while FIFA-S uses two traversals. Table III(b) in FIG. 14 demonstrates results for both AS6939 and AS33437. AS33437 has only 7 next hops, thus the aggregation ratio is better (58% vs 56% for FAQS and FIFA-S, respectively) and the burst size is larger than the one in AS6939, because one update in AS33437 may affect a larger area of next hops.

In conclusion, a number of FIB aggregation algorithms have been proposed. A few are highlighted here. The SMALTA algorithm uses the binary tree data structure and bases on ORTC algorithm, which can achieve one-time optimal aggregation. SMALTA takes ORTC as the initial FIB aggregation algorithm and processes updates without the optimization of a subtree, rooted at the updated node. Eventually, SMALTA requires full re-aggregation of the FIB table upon reaching FIB size threshold. It results in computational spikes and high time costs. The locality of FIB updates to build Locality-aware FIB Aggregation (LFA) algorithm has also been studied and employed. In LFA, re-aggregation for an updated prefix region is delayed until it is stabilized. However, such approach requires timers attached to nodes which may significantly complicate its operation in the real routers. A formal study has been conducted on the trade-off between FIB aggregation and update bursts. In addition, the algorithm HIMS that attaches time-dependent counters to each node has been presented as well. However, there is no information provided on the performance of the algorithm when processing real network routing data. MMS, the Memory Management System, has been proposed and was designed to prolong the lifetime of legacy routers in an ISP. MMS uses parallelization of ORTC and can aggregate routing tables locally or on an AS-level. Moreover, MMS may change the forwarding behavior of routers in order to gain additional compression.

Some FIB compression work uses smart data structures to minimize storage size of FIB. A tunable aggregation algorithm with compressed prefix trees has been presented. By changing the deepness of the compression, network operators can manage the trade-off between the aggregation ratio and BGP update overhead. Similarly, two algorithms, EAP-slow and EAP-fast have been presented and compared with ORTC. An aggregation algorithm for OpenFlow flow tables using prefix wildcards has also been proposed. FIB aggregation scheme, that applies multiple selectable next hops, was proposed as well. A virtual network system to implement and study FIB aggregation was also created. It is a reusable framework to test the performance of FIB aggregation algorithms in a realistic environment.

Aggregation algorithms such as Level-1 and Level-2 compress FIB quickly but bear costly update handling operations. FIFA algorithms, which improves ORTC algorithm by applying PATRICIA trie (PT) with incremental FIB aggregation features, was developed. The present FAQS algorithm described above, makes a good balance of aggregation time, ratio and memory consumption. It sacrifices very little aggregation ratio compared with the optimal solution, but speeds up the aggregation more than twice with much less memory consumption. Considering the real-time and efficiency requirements of FIB aggregation, the approach described herein is superior to the existing algorithms.

All definitions, as defined and used herein, should be understood to control over dictionary definitions, definitions in documents incorporated by reference, and/or ordinary meanings of the defined terms.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. A forwarding information base (FIB) aggregation system, comprising:

a router having a control plane with a routing information base (RIB) and a data plane with a forwarding information base (FIB), the control plane configured to run a BGP decision process;
a plurality of routes movable from the RIB to the FIB;
an aggregation module at the control plane configured to aggregate the plurality of routes and generate a copy of the FIB having the aggregate the plurality of routes;
one or more flags associated with the copy of the FIB having the aggregate the plurality of routes; and
the aggregation module further configured to use an algorithm to carry out incremental FIB updates.

2. The system of claim 1, further comprising a route update signal advertised by the BGP decision process.

3. The system of claim 2, wherein the router updates the RIB when the route update signal is advertised.

4. The system of claim 3, wherein the FIB updates the copy of the FIB having the aggregate the plurality of routes when the route update signal is advertised.

5. The system of claim 1, further comprising a line card at the data plane, the line card having a memory.

6. A method for installing FIB changes, comprising the steps of:
providing a forwarding information base (FIB) aggregation system, including a router having a control plane with a routing information base (RIB) and a data plane with a forwarding information base (FIB), and an aggregation module at the control plane;
receiving a plurality of routes at the aggregation module from the RIB;
aggregating the plurality of routes via the aggregation module to generate an aggregated FIB;
downloading the aggregated FIB into the FIB;
copying the aggregated FIB with one or more flags representing a processing decision to generate an aggregated FIB copy;
storing the aggregated FIB copy at the aggregation module;
receiving a router update at the RIB and updating the RIB according to the router update;
transmitting the router update to the aggregation module after it updates the RIB; and
updating the aggregated FIB copy incrementally, via the aggregation module, according to the router update.

7. The method of claim 6, wherein the router update is one of an addition, a change, and a withdrawal.

8. The method of claim 6, further comprising the step of adding a new entry to the FIB as a result of the router update.

9. The method of claim 6, further comprising the step of deleting an existing entry in the FIB as a result of the router update.

10. The method of claim 6, further comprising the step of changing a value of an existing entry in the FIB as a result of the router update.

* * * * *